US008782658B2

United States Patent
Ambat et al.

(10) Patent No.: US 8,782,658 B2
(45) Date of Patent: Jul. 15, 2014

(54) SYSTEM AND APPARATUS FOR MANAGING A STORAGE ARRAY UTILIZING A PLURALITY OF VIRTUAL MACHINES

(75) Inventors: Gopakumar Ambat, Bangalore (IN); Vishwanath Nagallingappa Hawargi, Bangalore (IN); Yask Sharma, Bangalore (IN)

(73) Assignee: LSI Corporation, San Jose, CA (US)

(*) Notice: Subject to any disclaimer, the term of this patent is extended or adjusted under 35 U.S.C. 154(b) by 439 days.

(21) Appl. No.: 13/112,446

(22) Filed: May 20, 2011

(65) Prior Publication Data

US 2012/0297381 A1   Nov. 22, 2012

(51) Int. Cl.
*G06F 9/46* (2006.01)
*G06F 9/455* (2006.01)
*G06F 13/00* (2006.01)
*G06F 15/173* (2006.01)

(52) U.S. Cl.
USPC ............... 718/104; 718/1; 711/114; 709/223

(58) Field of Classification Search
None
See application file for complete search history.

(56) References Cited

U.S. PATENT DOCUMENTS

| 7,206,832 | B2 * | 4/2007 | Matsunami et al. | 709/223 |
| 7,530,071 | B2 * | 5/2009 | Billau et al. | 718/104 |
| 8,281,305 | B2 * | 10/2012 | Otani | 718/1 |
| 2010/0058335 | A1 * | 3/2010 | Weber | 711/114 |

OTHER PUBLICATIONS

Feresten, Paul, "Storage Multi-Tenancy for Cloud Computing", 2010 Storage Networking Industry Association, Mar. 2010.

* cited by examiner

*Primary Examiner* — Meng An
*Assistant Examiner* — Bing Zhao
(74) *Attorney, Agent, or Firm* — Suiter Swantz pc llo

(57) ABSTRACT

A system for managing a storage array having a set of storage components comprises a storage array controller, the storage array controller including: a first instance of a controller firmware on a virtual machine in a privileged domain, the privileged domain having access to hardware of the storage array; and a second instance of the controller firmware on a separate virtual machine in a first non-privileged array domain. The privileged domain is configured to inspect an I/O request and determine whether a target of the I/O request is an existing non-privileged array domain, to initiate launch of the first non-privileged array domain array when the I/O request does not relate to an existing non-privileged array domain, and to present available storage components to the first non-privileged array domain when the I/O request relates to the first non-privileged array domain.

16 Claims, 3 Drawing Sheets ing request by a privileged domain;
SYSTEM AND APPARATUS FOR MANAGING A STORAGE ARRAY UTILIZING A PLURALITY OF VIRTUAL MACHINES

FIELD

The present disclosure generally relates to the field of data storage management, and more particularly to a system for a multi-tenant storage array via array domains hosted on a virtual machine.

BACKGROUND

Storage arrays, traditionally monolithic entities running firmware on a storage controller and managing input/output (I/O) to disks, are incorporating virtualization. With the advent of cloud computing, a paradigm shift is taking place in the storage industry. Cloud computing is a model for enabling on-demand network access to a shared pool of configurable computing resources (e.g., networks, servers, storage, applications, and services) that can be rapidly provisioned and released with minimal management effort or service provider interaction. While most of the focus on cloud computing is related to the infrastructure and software delivery/usage models, the concept of multi tenancy is gaining interest from a storage perspective. In an Infrastructure as a Service (IaaS) model, the storage infrastructure (i.e. array controller(s) and groups of disks) would be leveraged across multiple clients. Multi tenancy requires that data and configuration be partitioned within the storage array with an assurance that operations being performed in one of the tenants does not flow-in or be visible to any other tenant. These multi-tenancy requirements cannot be met by basic LUN mapping/partitioning.

As an example, two hosts (e.g., competing companies) may require storage provisioning from a storage infrastructure service. Carving out two different logical units on the same array would not serve the interests of the two hosts for at least two reasons. First, there is the risk of an invalid operation executed from one of the hosts in the configuration bringing down/incapacitating the entire array and hence hampering accessibility from other clients. Second, the hosts which requested the provisioned storage infrastructure may be wary of having their I/O's handled by the same instance of controller firmware that could potentially be handling I/O's for their competitors simultaneously and hence could inadvertently lead to data mismanagement. The traditional solution to this problem would be to configure two different storage arrays, provision storage space on them and allow the LUN mappings to the required hosts. As is evident, such a setup is not scalable, nor can such a setup meet the challenging demands of the cloud world.

SUMMARY

In one implementation of the present disclosure, a system for managing a storage array having a set of storage components comprises: a storage array controller, the storage array controller including: a first instance of a controller firmware on a virtual machine in a privileged domain, the privileged domain having access to hardware of the storage array, the privileged domain including a host port virtualization agent; and a second instance of the controller firmware on a separate virtual machine in a first non-privileged array domain. The privileged domain is configured to inspect an Input/Output (I/O) request and determine whether a target of the I/O request is an existing non-privileged array domain, the privileged domain is configured to initiate launch of the first non-privileged array domain array when the I/O request does not relate to an existing non-privileged array domain, and the privileged domain is configured to present available storage components to the first non-privileged array domain when the I/O request relates to the first non-privileged array domain.

In another implementation of the present disclosure, a method for managing a storage array having a set of storage components comprises: logically partitioning the storage array into a plurality of array domains, each array domain of the plurality of array domains including an instance of a storage controller firmware for managing the set of storage components; running each array domain of the plurality of array domains on a separate virtual machine on the same storage array controller; identifying, with a privileged domain, a target array domain of an Input/Output (I/O) request received by the storage array; and forwarding the I/O request to the identified target array domain.

In a further implementation of the present disclosure, a method for managing a storage array having a set of storage components comprises: logically partitioning the storage array into a plurality of array domains, each array domain of the plurality of array domains including an instance of a storage controller firmware for managing the set of storage components; running each array domain of the plurality of array domains on a separate virtual machine on the same storage array controller; receiving a provision request for storage within the storage array; determining whether a target of the provision request is an existing array domain; initiating a new array domain when the provision request is determined to not relate to an existing array domain; and presenting available storage components of the set of storage components to the target array domain when the provision request is determined to relate to an existing array domain.

It is to be understood that both the foregoing general description and the following detailed description are exemplary and explanatory only and are not necessarily restrictive of the disclosure as claimed. The accompanying drawings, which are incorporated in and constitute a part of the specification, illustrate an embodiment of the disclosure and together with the general description, serve to explain the principles of the disclosure.

BRIEF DESCRIPTION OF THE DRAWINGS

The numerous advantages of the present disclosure may be better understood by those skilled in the art by reference to the accompanying figures in which.

DETAILED DESCRIPTION

Reference will now be made in detail to the presently preferred embodiments of the present disclosure, examples of which are illustrated in the accompanying drawings.

According to an embodiment of the present disclosure, a VM on the storage array controller can be leveraged to effectively deliver a multi-tenant model where multiple customers could be provisioned storage by hosting different instances of the controller firmware running on separate virtual machines on the same storage array controller.

In one implementation of the present disclosure, a mechanism for logically partitioning the storage array into different "array domain" where each array domain is comprised of an instance of the storage controller firmware managing a set of disks. Multiple such array domains could co-exist on the same storage array controller, each running on a separate virtual machine. Each of these array domains could be created on the fly based on an infrastructure request and would involve creating of a new VM domain on the array controller and exposing some disks to this VM. The entire operation could be automated and such a virtual storage array could be created or torn down without any manual intervention or effort.

Figure 1:
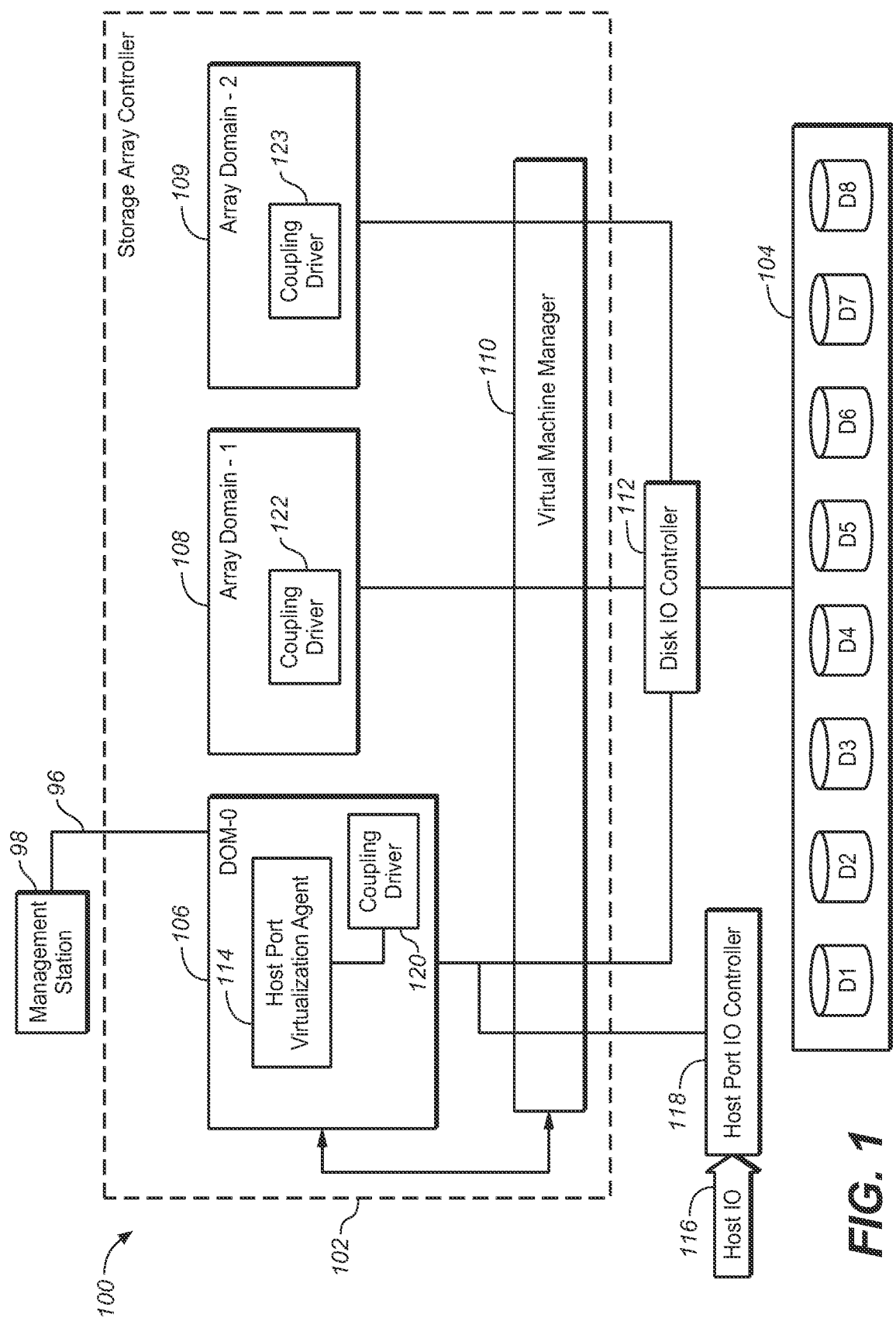
FIG. 1 is a schematic illustration of a system having multiple array domains managing different sets of disks hosted on a single storage array controller.

Referring now to FIG. 1, a schematic illustration of a system 100 having multiple array domains managing different sets of disks hosted on a single storage array controller is shown. System 100 includes a storage array controller 102 for managing a set of storage components 104. The storage array controller 102 may include a plurality of array domains 106, 108, 109 for accessing (e.g., reading, writing to, and the like) one or more of the storage components of the set of storage components 104. As shown in FIG. 1, the storage array controller 102 includes domain 0 ("Dom0"), indicated by reference character 108, which is a privileged domain, having full access to all underlying hardware associated with the storage array. Dom0 may control a virtual machine manager 110 (e.g., Xen Hypervisor) of the storage array controller 102. Dom0 may also discover the set of storage components 104 (i.e. disks and disk enclosures) at startup and maintain an inventory list of available storage elements via a disk I/O controller 112. Host ports may also be discovered and directly managed by Dom0 via a host port virtualization agent 114. In one implementation, Dom0 may be a tailored Linux kernel.

Management of a provision request for storage space is described by the following. A provision request may be presented to system 100 according to a number of implementations. For instance, in one implementation, a new provision request 96 for provisioning of storage space may originate from a management station 98 (e.g., an administrator request) which may be presented to Dom0 management software. In another implementation, a new request 116 for provisioning of storage space is presented to system 100 via an I/O path, such that a management software queries Dom0 and identifies available (i.e., un-provisioned) storage components. Physical storage disks and other storage components needed to satisfy the provision request are identified from the available storage components of the set of storage components 104, whereby Dom0 initiates launch of a new array domain, domain 1 ("Dom1"), indicated by reference character 108. Dom1 may run controller firmware, and in operation is presented with one or more disks on which it may create logical volumes, etc., as part of a typical firmware management process. Dom0 may present a virtual host port to Dom1 and may provide a virtual World Wide Name (WWN) ID to Dom1. After these domain initialization steps are performed, the controller firmware on Dom1 performs as though the controller firmware were running on a non-virtualized environment with full access to underlying hardware.

Management of an external I/O is described by the following. An external I/O request 116 may be received by a host port of a host I/O controller 118 of system 100. When an external I/O request 116 is received by the host port, Dom0 may trap the I/O request, inspect the request for a desired target, and forward the request appropriately to the specified array domain (i.e., Dom1, Dom2, etc.). It is contemplated that Dom0 may utilize a plurality of different techniques for identifying the intended target. In one implementation, system 100 ensures that Dom0 maintains a Logical Unit Number (LUN) virtualization so that every LUN that is created by the individual array domains (i.e., Dom1, Dom2, etc.) are mapped to a specific LUN number that is managed by Dom0. These managed LUN numbers may be exposed external to system 100, such as to the hosts. When the I/O request 116 originates from the host and is received by system 100, the intended LUN (which would be the virtual managed LUN) is gleaned and mapped to the LUN number created by the virtual array domains (i.e., Dom1, Dom2, etc.). Based on which array domain is configured to manage the request, the I/O request is re-directed by Dom0 to the appropriate domain.

In another implementation, system 100 may use an N port ID virtualization technique as specified in the American National Standards Institute (ANSI) T11 standard. According to this virtualization technique, Dom0 may create multiple virtual N ports identified by unique WWN's and present the virtual N ports to the Storage Area Network (SAN) fabric. Each of the virtual N ports may be mapped to one of the virtual array domains (i.e., Dom1, Dom2, etc.). An ITL nexus (i.e., initiator/target/logical unit relationship) is now established at port login to a particular virtual N port, whereby future I/O requests in that ITL nexus are routed to this virtual target via the virtual N ports. When the I/O request 116 is trapped by Dom0, the target is determined and, based on the target WWN, the I/O request 116 is passed on to the appropriate array domain (i.e., Dom1, Dom2, etc.) for further processing.

Dom0 may include a coupling driver 120 (according to Open Storage Architecture (OSA) terminology) that may be hosted on the virtual machine of Dom0 to forward I/O requests (e.g., SCSI requests) from Dom0 to another array domain (i.e., Dom1, Dom2, etc.). It may be appreciated that additional components may be included as part of the virtual machine manager 110, but are not marked in the figure. When an I/O request is forwarded from Dom0 to a specific array domain, the Dom0 coupling driver 120 acts as an initiator and a coupler driver (122, 123) on the respective array domain (Dom1, Dom2) acts as the target.

Figure 2:
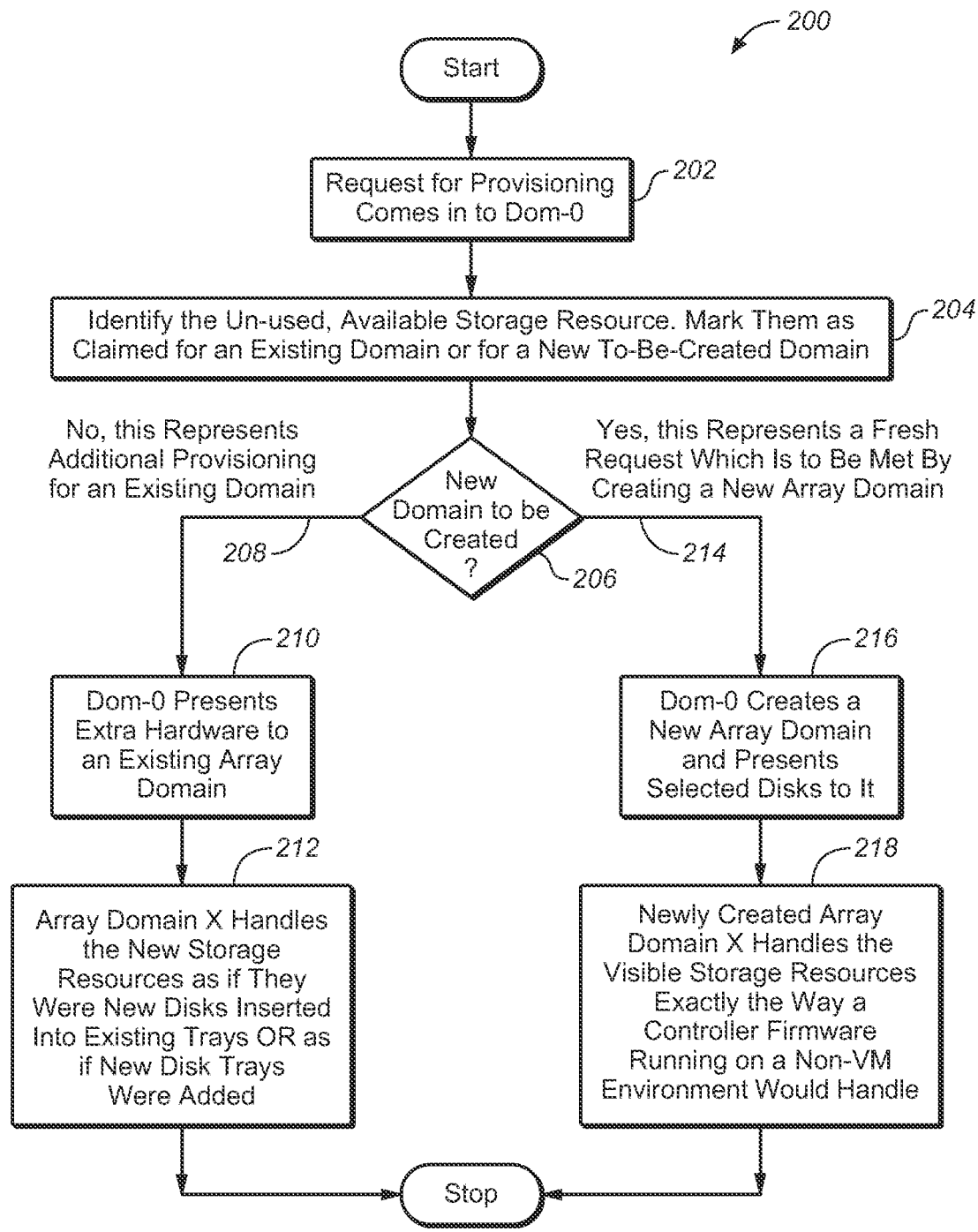
FIG. 2 is a flow chart of a process of handling a provisioning request by a privileged domain.

Referring now to FIG. 2, a flow chart of a process 200 of handling a provisioning request by a privileged domain (e.g., Dom0 of FIG. 1) is shown. A new provisioning request may be received/trapped by the privileged domain, Dom0, 202, such as via a Dom0 management software interface. Dom0 may identify unused, available storage resources (e.g., disks, disk trays, etc.) and then label the unused storage resources as either being claimed for an existing domain or claimed for a new-to-be-created domain, 204. A determination is made at 206 to determine whether the received provisioning request relates to an existing domain or to a to-be-created domain. When the provisioning request relates to an existing domain, 208, Dom0 would present additional storage components (disks, disk trays, etc.) to the associated array domain, 210. The existing, non-privileged array domain (e.g., Dom1, Dom2, etc.) may then handle the newly presented additional storage components as if they were new disks inserted into existing disk trays or as if new disk trays were added to the storage array, 212. For instance, the non-privileged array domain would now detect this additional hardware in the same way as a non-VM version of the controller firmware would detect new disks/trays inserted into the storage system. In this manner, each array domain may 'see' the entire set of disk trays in the array system but only a desired number of disks in the tray (those disks that are visible to each specific non-privileged array domain) would be seen by the respective non-privileged array domain as populated with all the other disk slots being reported as empty to the respective non-privileged array domain. As an example, the set of storage components 104 of FIG. 1 includes disks D1 through D8. Disks D1, D5, and D8 are managed by Dom2, disks D4, D6, and D7 are managed by Dom1, and disks D2 and D3 are unassigned disks. Thus, for Dom1, disks D4, D6, and D7 would appear populated, while disks D1, D2, D3, D5, and D8 would show up as empty slots for Dom1. Whereas for Dom2, disks D1, D5, and D8 would appear populated, while disks D2, D3, D4, D6, and D7 would show up as empty slots for Dom2.

When the determination at 206 of FIG. 2 indicates that the provisioning request relates to a to-be-created domain, 214, the privileged domain (e.g., Dom0) would create a new array domain and present the newly created array domain with selected disks to manage, 216. The newly created array domain would then manage the storage resources presented to it in the same way a non-VM version of the controller firmware would manage the storage resources, 218. For instance, traditional storage management software could provide management of individual array domains. Such software may include, by way of example, SANtricity® software sold by LSI Corporation. Additionally, management software may be revised/implemented for the privileged domain with administrator-only access which would identify free/used storage resources and provide the input for the privileged domain to create and launch a new array domain.

It is also contemplated that system 100 may be extended to a scale-out model where a virtualization agent running on an independent server may abstract out the I/O routing explained above. In this model, a virtualization appliance may manage one or many storage arrays, where each array would include multiple private array domains. The virtualization appliance may abstract out the WWN of the array domains and may map incoming host I/O's to a specified target array domain for processing.

System 100 may provide transparency when multiple new domains are created. As such, the firmware instance in an array domain may be identical or at least substantially similar to how firmware would have been configured had there been no virtualization layer. Additionally, if desired, configurable differences between firmware instances across domains may be achieved without having to build up an entirely new storage system configuration. Further, a new virtual storage array as represented by an array domain can be implemented or removed simply, without disturbing the rest of the configuration. Moreover, multi-tenancy may be achieved by having independent domains with a privileged domain identify which can handle a specific I/O request, without performing direct I/O handling.

Figure 3:
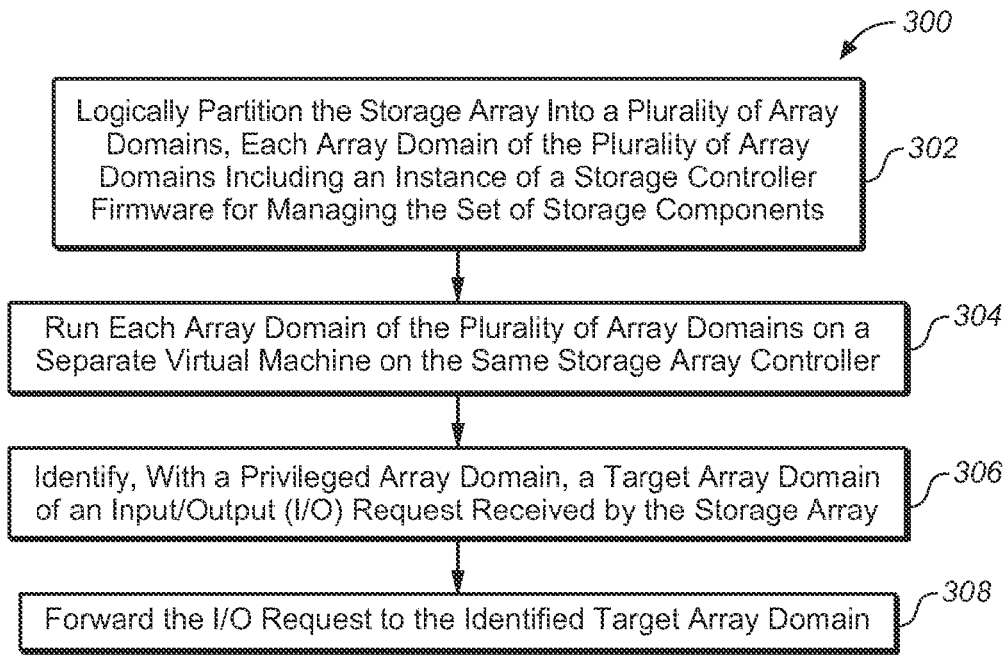
FIG. 3 is a flow chart of a method for managing a storage array having a set of storage components according to an implementation of the present disclosure.

Referring now to FIG. 3, a method 300 for managing a storage array having a set of storage components is shown according to an implementation of the present disclosure. Method 300 includes logically partitioning the storage array into a plurality of array domains, each array domain of the plurality of array domains including an instance of a storage controller firmware for managing the set of storage components, 302. Method 300 also includes running each array domain of the plurality of array domains on a separate virtual machine on the same storage array controller, 304. Method 300 also includes identifying, with a privileged domain, a target array domain of an Input/Output (I/O) request received by the storage array, 306. Method 300 further includes forwarding the I/O request to the identified target array domain, 308.

Figure 4:
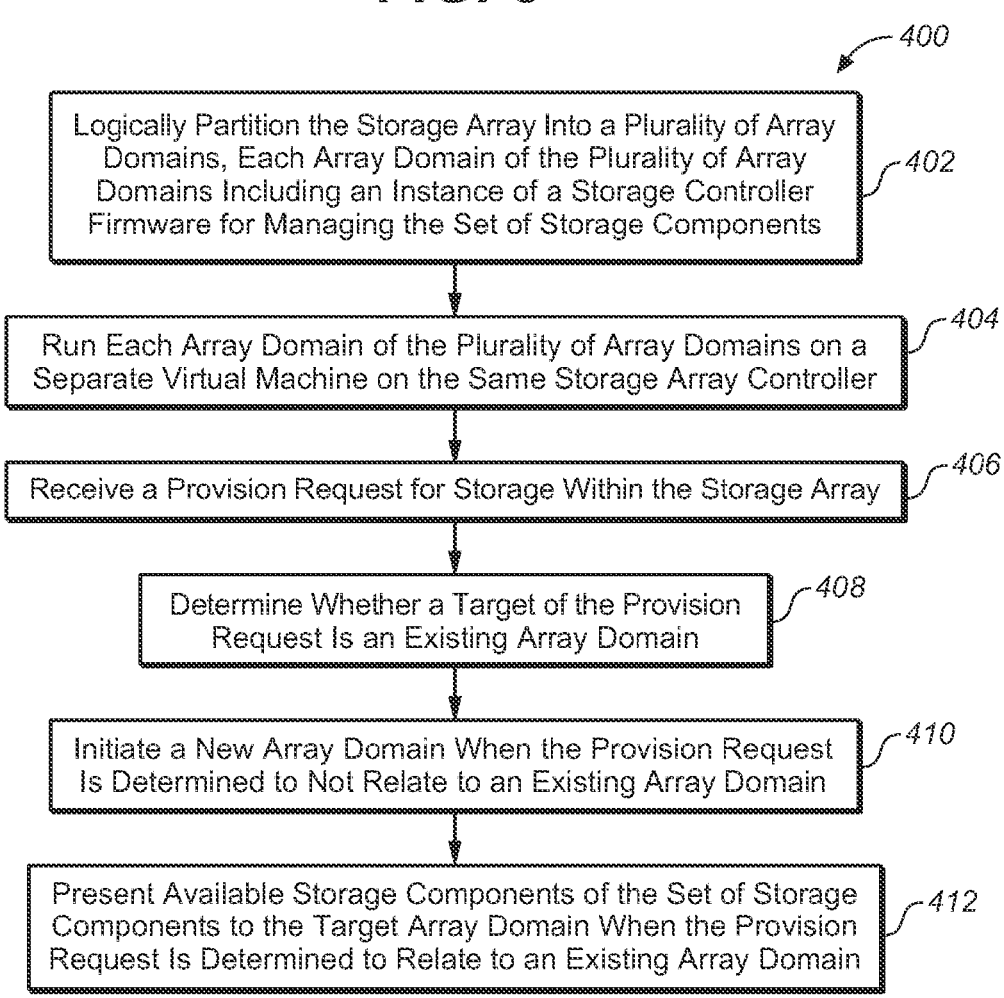
FIG. 4 is a flow chart of a method for managing a storage array having a set of storage components according to another implementation of the present disclosure.

Referring now to FIG. 4, a method 400 for managing a storage array having a set of storage components is shown according to another implementation of the present disclosure. Method 400 includes logically partitioning the storage array into a plurality of array domains, each array domain of the plurality of array domains including an instance of a storage controller firmware for managing the set of storage components, 402. Method 400 also includes running each array domain of the plurality of array domains on a separate virtual machine on the same storage array controller, 404. Method 400 also includes receiving a provision request for storage within the storage array, 406. Method 400 also includes determining whether a target of the provision request is an existing array domain, 408. Method 400 also includes initiating a new array domain when the provision request is determined to not relate to an existing array domain, 410. Method 400 further includes presenting available storage components of the set of storage components to the target array domain when the provision request is determined to relate to an existing array domain, 412.

Although the various method steps of FIGS. 3 and 4 are presented in the sequence(s) illustrated, it should be understood that the various steps may be performed in other orders than those that are illustrated, or may be performed concurrently.

Accordingly, the embodiments of the present disclosure implement an array domain which allows for an automated response to storage demand by creating a VM hosting storage array firmware and managing a specified set of disks. Accordingly, the system of the present disclosure may provide true multi-tenancy by ensuring that each tenant, while co-located on the same storage array, is insulated from its neighbor tenants and can be managed/handled as if it were an independent physical storage array. Specifically, the system herein provides a means for tracking storage usage per tenant, provides for data protection (across tenants), and provides for non-disruptive upgrades/repairs on a particular tenant without affecting the operability of the other tenant(s).

It is believed that the present disclosure and many of its attendant advantages will be understood by the foregoing description, and it will be apparent that various changes may be made in the form, construction and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A system for managing a storage array having a set of storage components, comprising:
    a storage array controller, the storage array controller including a computing device configured for hosting a plurality of virtual machines, wherein the plurality of virtual machines including:
        a first virtual machine running a first instance of a controller firmware, the first virtual machine being configured to control storage components in a privileged domain, wherein the privileged domain includes all storage components of the storage array; and
        a second virtual machine running a second instance of the controller firmware, the second virtual machine being configured to control storage components in a first non-privileged array domain, wherein the first non-privileged array domain includes a subset of the storage components of the storage array;
    wherein each of the set of storage components is inserted into a corresponding storage component slot in the storage array, wherein only the storage components in the subset of the storage components in the first non-privileged array domain are presented to the first non-privileged array domain as being inserted, and wherein storage component slots for other storage components not in the subset of the storage components in the first non-privileged array domain are presented to the first non-privileged array domain as empty storage component slots; and wherein the first virtual machine is further configured to:
handle a provision request and determine whether the provision request relates to the first non-privileged array domain, and
present at least one additional storage component to the first non-privileged array domain when the provision request relates to the first non-privileged array domain.

2. The system of claim 1, wherein the first virtual machine is configured to discover the set of storage components upon start-up.

3. The system of claim 1, wherein the first virtual machine is configured to maintain an inventory list of available storage components of the set of storage components.

4. The system of claim 1, wherein the storage array controller further includes a virtual machine manager.

5. The system of claim 4, wherein the first virtual machine is configured to control the virtual machine manager of the storage array controller.

6. The system of claim 1, wherein the first virtual machine is further configured to: inspect a read/write input/output (I/O) request to identify a target of the I/O request, determine whether the target of the I/O request belongs to the storage components in the first non-privileged array domain, and forward the I/O request to the second virtual machine when the target of the I/O request belongs to the storage components in the first non-privileged array domain.

7. The system of claim 1, wherein the plurality of virtual machines hosted on the computing device of the storage array controller further includes a third virtual machine running a third instance of the controller firmware, the third virtual machine being configured to control storage components in a second non-privileged array domain, wherein the second non-privileged array domain includes a subset of the storage components of the storage array that is different from the first mentioned subset of the storage components in the first non-privileged array domain.

8. A method for managing a storage array having a set of storage components, comprising:
hosting a plurality of virtual machines, wherein the plurality of virtual machines including:
a first virtual machine running a first instance of a storage controller firmware, the first virtual machine being configured to control storage components in a privileged domain, wherein the privileged domain includes all storage components of the storage array; and
a second virtual machine running a second instance of the storage controller firmware, the second virtual machine being configured to control storage components in a non-privileged array domain, wherein the non-privileged array domain includes a subset of the storage components of the storage array;
utilizing the first virtual machine to handle provision requests and determine whether the provision request relates to the non-privileged array domain;
presenting at least one additional storage component to the non-privileged array domain when the provision request relates to the non-privileged array domain;
wherein each of the set of storage components is inserted into a corresponding storage component slot in the storage array, wherein only the storage components in the subset of the storage components in the non-privileged array domain are presented to the non-privileged array domain as being inserted, and wherein storage component slots for other storage components not in the subset of the storage components in the non-privileged array domain are presented to the non-privileged array domain as empty storage component slots.

9. The method of claim 8, further including:
controlling a virtual machine manager utilizing the first virtual machine.

10. The method of claim 8, further comprising:
identifying, utilizing the first virtual machine, a target of an Input/Output (I/O) request received by the storage array.

11. The method of claim 10, wherein the target of the Input/Output (I/O) request is identified based on at least one of: an N port ID virtualization technique, and a Logical Unit Number (LUN) comparison.

12. The method of claim 11, wherein utilizing an N port ID virtualization technique includes:
creating a plurality of virtual N ports, each virtual N port identified by a unique World Wide Name (WWN);
mapping each of the plurality of virtual N ports to one of the plurality of array domains; and
identifying a WWN of the target array domain of the I/O request.

13. The method of claim 8, further including:
restricting access by the non-privileged array domain to storage components that are not under control of the non-privileged array domain.

14. A method for managing a storage array having a set of storage components, comprising:
hosting a plurality of virtual machines, wherein the plurality of virtual machines including:
a first virtual machine running a first instance of a storage controller firmware, the first virtual machine being configured to control storage components in a privileged domain, wherein the privileged domain includes all storage components of the storage array; and
a second virtual machine running a second instance of the storage controller firmware, the second virtual machine being configured to control storage components in a non-privileged array domain, wherein the non-privileged array domain includes a subset of the storage components of the storage array;
receiving a provision request for storage within the storage array;
determining whether the provision request relates to the non-privileged array domain;
initiating a new array domain when the provision request is determined to not relate to the non-privileged array domain; and
presenting at least one additional storage component of the set of storage components to the non-privileged array domain when the provision request is determined to relate to the non-privileged array domain;
wherein each of the set of storage components is inserted into a corresponding storage component slot in the storage array, wherein only the storage components in the subset of the storage components in the non-privileged array domain are presented to the non-privileged array domain as being inserted, and wherein storage component slots for other storage components not in the subset of the storage components in the non-privileged array domain are presented to the non-privileged array domain as empty storage component slots.

15. The method of claim 14, further including:

controlling a virtual machine manager utilizing the first virtual machine.

16. The method of claim 14, further including:

restricting access by the non-privileged array domain to storage components that are not under control of the non-privileged array domain.

* * * * *